United States Patent [19]

Krivohlavek

[11] Patent Number: 5,137,572
[45] Date of Patent: Aug. 11, 1992

[54] EMULSIFIER AND METHOD OF USING IN MIXING GRADE EMULSIONS

[75] Inventor: Dennis Krivohlavek, Claremore, Okla.

[73] Assignee: Asphalt Technology & Consulting, Inc., Claremore, Okla.

[21] Appl. No.: 703,811

[22] Filed: May 21, 1991

[51] Int. Cl.⁵ .......................... C08L 95/00; B01J 13/00
[52] U.S. Cl. .................. 106/277; 252/311.5; 252/351; 252/352
[58] Field of Search ..................... 252/311.5, 352, 351; 106/277, 281

[56] References Cited

U.S. PATENT DOCUMENTS

| | | | |
|---|---|---|---|
| 2,585,336 | 2/1952 | McCoy | 252/311.5 |
| 3,006,860 | 10/1961 | Heinz | 252/311.5 |
| 3,018,282 | 1/1962 | Crecelious | 260/234 |
| 3,110,604 | 11/1963 | McConnaughay | 106/277 |
| 3,240,716 | 3/1966 | Mertens | 252/311.5 |
| 3,615,796 | 10/1971 | Schreuders | 106/277 |
| 4,494,992 | 1/1985 | Schilling et al. | 106/277 |
| 4,561,901 | 12/1985 | Schilling et al. | 106/277 |
| 5,034,060 | 7/1991 | Schilling et al. | 106/277 |

Primary Examiner—Richard D. Lovering
Assistant Examiner—N. Bhat
Attorney, Agent, or Firm—Head & Johnson

[57] ABSTRACT

An emulsifier and method for its use in mixing grade emulsion systems of a chemical structure containing a tall oil and/or fatty acid portion, a hydrocarbon oxide portion, and a phosphate functionality. Variations in the components and the order of attachment compensate for variations in field conditions. The newly synthesized molecule may then be used to create mixing grade asphaltic emulsions.

7 Claims, No Drawings

EMULSIFIER AND METHOD OF USING IN MIXING GRADE EMULSIONS

BACKGROUND OF THE INVENTION

1. Field of the Invention

The field of this invention is chemical emulsifying agents, or surfactants, and their use in asphalt emulsion technology.

2. Description of the Related Art

Properties of an asphalt emulsion depend greatly upon the chemical used as the emulsifier. An emulsifier is a surface-active agent that maintains the asphalt droplets of the asphalt emulsion in stable suspension and permits breaking at the proper time. The emulsifier does this by changing the surface tension at the area of contact between the asphalt droplet and the water in the emulsion.

Emulsifiers are classified in three categories, anionic, cationic, or nonionic. Among the most common anionic emulsifiers for asphalts are fatty acid wood product derivatives such as tall oils, rosins, and lignins. These anionic emulsifiers are most typically saponified through a reaction with potassium hydroxide or sodium hydroxide.

The most common cationic emulsifiers are fatty amines such as diamines, imidazolines, and amidoamines, and fatty quaternary ammonium salts. The fatty amines are saponified through reaction with an acid, most typically hydrochloric. Fatty quaternary ammonium salts are stable, water-soluble salts that make effective cationic emulsifiers.

A long-felt need has existed among those schooled in the art of asphaltic mixing grade emulsions to control the mixability of the mixing grade emulsion/aggregate mixture to both mix for long periods of time and the emulsion still have the ability to break, and/or set, or otherwise create a bond between the ruptured or rupturing asphalt droplet of the emulsion and the aggregate within a short period of time under laboratory conditions. It is desired to have a mix time greater than five (5) minutes while retaining the emulsion's bond, break, and/or setability to within thirty (30) minutes. It is also desirous to be able to correct or adjust the emulsion formulation to accommodate variations in operational conditions. Examples of these variations include aggregate type, aggregate gradation, aggregate moisture, aggregate adsorption, total moisture in the emulsion-/aggregate mixture, and actual field conditions. Those schooled in the art of asphaltic mixing grade emulsions could traditionally control the above-described parameters by decreasing aggregate moisture, total moisture, or other similar adjustments to the aggregate portion of the emulsion/aggregate mixture. If adjustment to the aggregate portion was not practical, then adjustments to the emulsifier and/or emulsifiers, used in making the emulsion were attempted. These attempts to adjust the emulsion/aggregate mixture through the emulsifier portion of the emulsion will generally create problems such as the inability of the emulsion/aggregate mixture to mix for five (5) minutes and/or slow break and/or set times (greater than thirty minutes).

The technique of adjusting the emulsifier portion may incorporate the use of non-ionic emulsifiers which contain no functional end group on the molecule of the chemical used. A further technique is to use other combinations of chemicals known in the asphalt emulsion industry to improve the mixability of the emulsion/aggregate mixture. Examples of chemicals known in the industry to improve the mixability of the emulsion/aggregate mixture include but are not limited to: primary amines and/or hydrocarbon oxides thereof; secondary amines and/or hydrocarbon oxides thereof; tertiary amines and/or hydrocarbon oxides thereof; quaternary amines and/or hydrocarbon oxides thereof; amido amines and/or hydrocarbon oxides thereof; imidazolines and/or hydrocarbon oxides thereof; sulfates and/or hydrocarbon oxides thereof; sulfites and/or hydrocarbon oxides thereof; carboxylic acids and/or the like and/or hydrocarbon oxides thereof; ethoxylated and/or propoxylated (and/or the like and/or similar hydrocarbon oxides) and/or other similar or like chemical moieties and/or variations; and/or mixtures of any or all the above thereof.

The use of these chemicals may be helpful in improving one particular parameter in the emulsion/aggregate mixture, but will adversely affect other parameters. An example of this is the common use of nonylphenol ethoxylates that have high molar quantities (>50 and typically 100 moles) of ethylene oxide reacted with the nonylphenol to form this chemical family that is used as the primary emulsifier in the emulsion portion of the mix. Nonylphenol ethoxylates (and in particular those described above) will improve the mixability but will adversely affect the break and/or set time (normally excessively lengthened), as well as the cure or adhesion to the aggregate portion of the emulsion/aggregate mixture.

Another technique used to control or improve the mixability and/or break and/or set time of the emulsion-/aggregate mixture is to decrease the amount of moisture present in the aggregate to less than one percent (1%) by weight of aggregate and add petroleum distillates (naphtha, kerosene, diesel, and the like) either singularly or in various combinations to the emulsion formulation. Petroleum distillates will not normally tolerate aggregate moisture contents above one percent (1%) by weight of aggregate while still allowing for mixing and one hundred percent (100%) coating of the aggregate by the emulsion during the emulsion/aggregate mixing portion of the overall operation. The inability of the emulsion containing petroleum distillates to mix at ambient temperatures with aggregates with a moisture content typically greater than two percent (2%) by weight of aggregate is of great commercial significance. The inability of the emulsion containing petroleum distillates, sometimes referred to as "cutback" emulsions, to mix with aggregates of higher moisture content creates the necessary and costly step of drying the aggregate to typically less than one percent (1%) by weight of water before coating or mixing of the emulsion will occur. Further, the distillate content of the emulsion formula is generally above six percent (6%) by weight of total emulsion and is usually between eight and fifteen percent (8 and 15%) by weight of total emulsion. Petroleum distillates can, and often do, place the emulsion mixing grade products in an economically disadvantaged position with other products in the marketplace, such as cutback asphalt, hot mix, and other type products.

The particular problem of adding petroleum distillates to the emulsion formulation also creates specific problems related to the petroleum distillate's effect on the physical properties of the emulsion residue from distillation. Examples of such physical properties of the emulsion residue from distillation adversely affected by the addition of petroleum distillates to the emulsion formulation are:
1. high penetration values;
2. low absolute viscosity values;
3 low ring and ball softening point values.

Previous to the invention disclosed herein, it was not practical, and in some cases impossible, to control the abovedescribed relationships of the emulsion/aggregate mixture. Further, it was also difficult (and in some cases impossible) to control the above-described relationships of the emulsion residue from distillation properties due to the undesirable effects of the emulsifier and the use of petroleum distillates used as part of the emulsion formulation when making the mixing grade emulsion portion of the emulsion/aggregate mix.

SUMMARY OF THE INVENTION

The object of this invention is to synthesize a new molecule composed of various fatty acids and/or tall oil rosins/fatty acids/unsaponifiables, and alcohols thereof, hydrocarbon oxides, and with a phosphoric acid functionality to create a new class of chemical moieties for use as emulsifiers in asphaltic emulsions. These emulsions would be primarily used as, or known as, mixing grade emulsion systems.

A further object of this invention is to vary the components of the emulsifier's chemical structure in order to maintain the optimal mix and break times of the asphalt emulsion thereby compensating for the many variables in field conditions normally experienced by those skilled in the art. These variables include the type of asphalt used, the type of aggregate used, the moisture content of the aggregate, and the gradation of the aggregate. Alterations of the emulsifier molecule to compensate for these variations in field conditions include changing the amount and type of hydrocarbon oxide used, changing the lipophilic end of the molecule, adjusting the pH of the emulsifier/water solution and/or the resulting emulsion, and the amount of water added to the mixture.

DETAILED DESCRIPTION OF THE PREFERRED EMBODIMENT

This newly synthesized molecule is created for use as an emulsifier in asphaltic emulsions. This new molecule consists of a fatty acid and/or tall oil portion, and/or alcohols thereof, a phosphate functionality, and a hydrocarbon oxide portion.

The fatty acid portion of the molecule can be comprised of a single type of fatty acid or any mixture of fatty acids, and or alcohols thereof, which can be derived from natural sources, synthetic or a combination of both and then may be either polymerized or unpolymerized to various molecular weights.

Tall oil chemicals, which are made from tree processing, can be mixed with the fatty acids, and or alcohols thereof, on the molecule or may replace the fatty acid portion completely. The preferred embodiment would contain a mixture of tall oil rosins and tall oil fatty acids. The rosin content of the tall oil could be from 5% and 100% with the balance being mixed tall oil fatty acids, rosins, and unsoaponifiables (sometimes called insolubles) as they are normally found in the processing of wood based chemicals. The tall oil rosin may be either polymerized or unpolymerized of various molecular weight ranges.

The hydrocarbon oxide used may be selected from any number of commercially available products. Examples of these are ethylene oxide, propylene oxide, butylene oxide, ethoxylate, or similar derivations thereof. The total quantity of oxide present in the final structure of the molecule being from one (1) to three hundred (300) moles with the normal quantity present being between fifty (50) and one hundred (100) moles.

The phosphoric acid functionality, conventionally termed the phosphate functionality, is achieved by a phosphorilization reaction generally known to one schooled in the art of chemical synthesis. The phosphoric acid functionality is comprised of at lest one molar unit of phospharic acid reacted onto the end of the tall oil component or the hydrocarbon oxide portion. The phosphoric acid functionality may be polymerized molar units of phosphoric acid.

The preferred molecular structure of the molecule is to have the tall oil/fatty acid portion of the molecule on one end, the hydrocarbon oxide portion of the molecule in the middle, and the phosphate functionality on the end. The order of chemical moieties in final molecular structure would then look as follows:

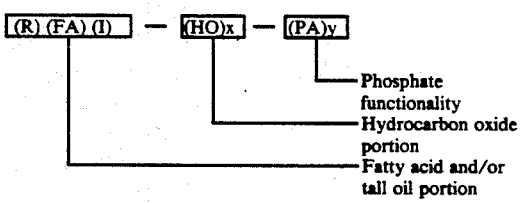

Where:
R = tall oil rosin content in wt %;
FA = fatty acid(s) and tall oil fatty acid content in wt %;
I = tall oil unsaponfiables (or insolubles) content in wt %;
HO = hydrocarbon oxide;
x = number of moles of hydrocarbon oxide;
PA = Phosphoric Acid;
y = number of moles of phosphoric acid.

The tall oil unsaponifiables are not chemically essential to the fatty acid portion of the molecule, however they are naturally present when crude tall oil is used, or when products of crude tall oil distillation are used, such as a distilled 30% tall oil rosin, 70% tall oil fatty acid may have present, as in example I.

The lipophilic portion of the molecule could be made from tall oil rosin, tall oil fatty acid, synthesized fatty acid, fatty alcohol, or any combination of those constituents such as, a mixture of tall oil rosin and tall oil fatty acid, a mixture of dimerized tall oil rosin and tall oil fatty acid, a mixture of tall oil rosin and synthetic fatty acid, a mixture of tall oil fatty acid and synthetic fatty acid, a mixture of tall oil rosin and fatty alcohol, a mixture of tall oil fatty acid and fatty alcohol, as examples.

When tall oil products are used to synthesize an emulsifier molecule, either alone or in a mixture with fatty acid moieties, subsequently combined with water, mineral acid or base, and asphalt to create a mixing grade emulsion, the following results are produced as compared with the asphalt before emulsification:
1. the same or lower penetration;
2. the same or increased absolute viscosity of the residue of the emulsion distillation;

3. the same or increased ring and ball softening point; depending upon the type of asphalt used.

Table I shows representative values of these parameters using ASTM testing procedures.

The presence of tall oil rosin acids on the emulsifier changes the above properties of the resulting emulsion and is one of its purposes for being present. When tall oil acids are used in combination with alcohols, the tall oil acid must first be decarboxylated in order to make it inert. By decarboxylating the tall oil molecule, the active site is removed thereby rendering it incapable of causing a side reaction. The presence of the tall rosin oil molecule affects the penetration, absolute viscosity, and ring and ball softening without causing any undesirable side reactions. The chemical structure of a typical decarboxylated tall oil rosin acid used for this purpose is:

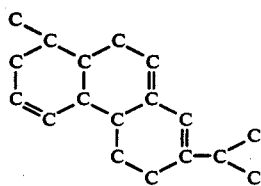

Example 5 describes the synthesis of the emulsifier molecule using decarboxylated tall oil rosin mixed with alcohol.

TABLE I

| Rosin Content (wt %) | 0 | 20 | 30 | 40 |
| --- | --- | --- | --- | --- |
| Penetration at 77° | 120 | 114 | 103 | 95 |
| Absolute viscosity 140° F. | 500 | 560 | 700 | 790 |
| Ring and ball softening point °F. | 103 | 105 | 109 | 114 | where the total emulsifier concentration in the emulsion is 1%, and 0 rosin content represents unemulsified asphalt with the penetration, absolute viscosity, and ring and ball softening values corresponding thereto.

EXAMPLE 1

This example enumerates the preferred synthesis of the emulsifier molecule. In order to create the lipophilic portion of the molecule, 30% tall oil rosin is combined with 70% tall oil fatty acid. This mixture of tall oil rosin and tall oil fatty acid is well known in the art and available commercially from Arizona Chemical Company as D30LR. One mole of this tall oil rosin/fatty acid mixture is then reacted with a desired molar (generally 25, 50, 75, or 100 moles) concentration of ethylene oxide; the preferred molar concentration being 75 moles. This product is then reacted with one mole of phosphoric acid (highly concentrated phosphoric acid reacts best) in order to complete the synthesis of the molecule. The chemical structure of this molecule would look as follows:

$$R-COO-(CH_2CH_2O)_{75}-OPO(OH)_2$$

where R is the tall oil rosin, tall oil fatty acid chain of $C_{12}$ and greater.

EXAMPLE 2

This example enumerates a synthesis of an alternate embodiment of the emulsifier molecule. In order to create the lipophilic portion of the molecule in this embodiment, one mole of tall oil rosin, derived from the distillation of crude tall oil is reacted with a desired molar concentration of hydrocarbon oxide (generally 25, 50, 75, 100 moles). For this example 50 moles of propylene oxide is employed. This product is then reacted with one mole of phosphoric acid in order to complete the synthesis of the molecule. The chemical structure of this molecule would look as follows:

$$R-COO-(CH_2CH_2CH_2O)_{50}-OPO(OH)_2$$

R—COO is an aromatic rosin with a carbon structure of $C_{14}$ or greater.

EXAMPLE 3

Example 3 illustrates the synthesis of the emulsifier molecule of this invention employing tall oil fatty acids as the lipophilic portion of the molecule. One mole of tall oil fatty acid is reacted with a desired molar concentration of hydrocarbon oxide (generally 25, 50, 75, or 100 moles). For this example, 25 moles of butylene oxide is employed. This product is then reacted with one mole of phosphoric acid in order to complete the synthesis of the molecule with the structure:

$$R-COO-(CH_2CH_2CH_2CH_2O)_{25}-OPO(OH)_2$$

R—COO is a straight chain fatty acid with a carbon chain length of $C_{12}$ or greater.

EXAMPLE 4

This example demonstrates a synthesis of the emulsifier molecule of this invention with synthetic straight chain fatty acid as the lipophilic portion of the molecule. This fatty acid can be synthesized by the standard methods known to those skilled in the art of chemical synthesis. One mole of synthetic fatty acid is reacted with a desired molar concentration of hydrocarbon oxide. For this example 75 moles of ethylene oxide is used. This product is then reacted with one mole of phosphoric acid in order to complete the synthesis of the molecule with the chemical structure:

$$R-COO-(CH_2CH_2O)_{75}-OPO(OH)_2$$

R—COO is a straight chain synthetic fatty acid with a carbon chain of $C_{12}$ or greater.

EXAMPLE 5

Example 5 illustrates the synthesis of the emulsifier molecule of this invention employing fatty alcohols derived from either synthetically or naturally as the lipophilic portion of the molecule. One mole of fatty alcohol is reacted with a desired molar concentration of hydrocarbon oxide (generally 25, 50, 75, or 100 moles). For this example, 75 moles of ethylene oxide is employed. This product is then reacted with one mole of phosphoric acid in order to complete the synthesis of the molecule with the structure:

$$R-CO-(OCH_2CH_2)_{75}-OPO(OH)_2$$

R—CO is a fatty alcohol with a carbon chain length of $C_{12}$ or greater.

Another embodiment of the emulsifier molecule would be synthesized by placing the fatty acid portion on one end, the phosphate functionality in the middle, and the hydrocarbon oxide functionality on the end. The order of chemical moieties in this embodiment would look as follows:

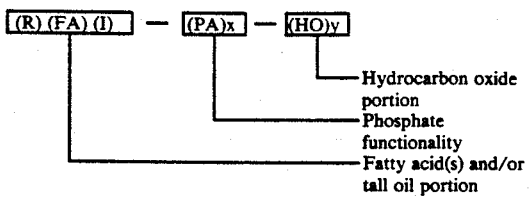

— Hydrocarbon oxide portion
— Phosphate functionality
— Fatty acid(s) and/or tall oil portion where:
R = tall oil rosin content in wt %;
FA = fatty acid(s) and/or tall oil fatty acid content in wt %;
I = tall oil unsaponifiables content in wt %;
PA = Phosphoric Acid;
X = Number of Moles of Phosphoric Acid;
HO = hydrocarbon oxide;
Y = number of moles of hydrocarbon oxide.

EXAMPLE 6

This example enumerates an alternate embodiment of the emulsifier molecule. The method of creating the lipophilic portion of the molecule is the same as in Example 1, 30% tall oil rosin is combined with 70% tall oil fatty acid. One mole of this tall oil/fatty acid mixture is then reacted with one mole of highly concentrated phosphoric acid. One mole of this product is then reacted with a desired molar concentration (generally 25, 50, 75, or 100 moles) of ethylene oxide; the preferred molar concentration being 75 moles to complete the chemical synthesis. The chemical structure of this molecule would look as follows:

R—COO—represents the fatty acid/rosin mixture where R is $C_{12}$ or higher.

The lipophilic portion of this embodiment can be synthesized using tall oil rosin, tall oil fatty acid, a mixture of tall oil rosin and tall oil fatty acid, dimerized tall oil rosins and tall oil fatty acids, and synthetic fatty acid in the same manner as enumerated in examples 1-4. It is obvious to one skilled in the art of chemical synthesis that one may add additional phosphate groups to the hydrocarbon oxide end of the molecule.

The newly synthesized molecule may then be used to create mixing grade asphaltic emulsions. These emulsions may be created in a manner consistent to the asphalt industry or in any other suitable method. The resulting emulsion has properties and advantages heretofore unattainable by other means. Table I represents the components of a typical emulsion created using this emulsifier.

TABLE II

| Emulsifier | 0.8%–1.5% |
|---|---|
| Water $H_2O$ | 25%–48% |
| Asphalt | 55%–75% |
| Acid (HCl) or base (NaOH) (if desired) | 0%–0.5% |

The use of this emulsifier allows for changes to be made in the resulting emulsion to compensate for variables one regularly faces in the industry without changing the properties of the emulsion. The most common variables one faces in the industry include: 1) asphalt type; 2) aggregate gradation; 3) aggregate moisture; 4) aggregate type; 5) weather conditions; 6) construction practice, and; distance from the job site. In addition the demands of changing field conditions during normal operations can be easily and effectively met.

Accommodating for these different variables can generally be done through one, or more, of the following: 1) increasing the volume of emulsifier used in the emulsion formulation; 2) changing the pH of the emulsion; 3) changing the amount and/or type of hydrocarbon oxide used; 4) varying the lipophilic end of the molecule, and; 5) the introduction of additional of water to the emulsion/aggregate mix. Making one or more of these changes in the emulsion at the facility in which it is mixed for transport to the site allows the use of a single versatile emulsifier that can be adapted to suit any type of field conditions while maintaining the ability to both mix for long periods of time and break (or set) within thirty minutes of application. The mix time is important depending upon the distance the job site is from the mixing facility. When the mix time is longer, the job site can be farther away from the mixing facility. The emulsion and aggregate can be mixed, transported to the job site, mixed again, and then spread. It is desirous for the emulsion to break within thirty minutes to sixty minutes after it is laid down. Table III shows a typical emulsion/aggregate mix.

TABLE III

| | wt. % (based on aggregate) |
|---|---|
| emulsion | 4–6 (≧65% residue) |
| aggregate | 100 grams |
| mixing $H_2O$ | 2–8 |

The mix time of the emulsion can be varied through regulation of the volume of the emulsifier used in the resulting emulsion. Increasing the quantity of emulsifier in the emulsion will cause it to break slower. Conversely, decreasing the weight percent of emulsifier in the resulting emulsion will cause it to break faster.

The resultant emulsion prepared from the emulsifier of this invention has a pH of about 3.5. In order to adjust the pH of the emulsion lower a suitable acid, such as hydrochloric (HCl) is added. The addition of acid in this manner causes the resulting emulsion to remain cationic. In order to adjust the pH of the resultant emulsion higher, a base such as sodium hydroxide (NaOH) is added. The addition of base to the emulsion may cause it to become classified as anionic, depending on how much is added. The weights by percent of the acid or base necessary to arrive at a desired pH are illustrated in table IV.

TABLE IV

| pH of product emulsion | wt % | Acid/Base |
|---|---|---|
| 2 | .1 | HCl (Industrial grade) |
| 3.5 | — | — |
| 7 | .1 | 50% NaOH |
| 10.5 | .3–.4 | 50% NaOH |

HCl and NaOH are used for exemplification purposes only, any suitable mineral or organic acid or base is acceptable.

Changing the amount of hydrocarbon oxide used in the emulsifier will change the break (or set) time of the resulting emulsion. Longer chain lengths of the hydrocarbon oxide portion of the emulsifier slow down the reaction (break) time of the emulsion. Conversely, shorter chain lengths of the hydrocarbon oxide portion of the emulsifier speed up the break time of the emulsion. Table V uses ethylene oxide as an example and compares the number of moles used with the resultant break time of the emulsion in a laboratory mixing test.

TABLE V

| moles ethylene oxide | break time (min.) |
| --- | --- |
| 25 | 1 |
| 50 | 2.5 |
| 75 | 3.5 |
| 100 | 5.5 |

100 grams of aggregate of a gradation as depicted in TABLE V 4% water ($H_2O$) emulsion containing 31% $H_2O$, 1% emulsifier, no acid or base, 68% asphalt Changing the type of hydrocarbon oxide also affects the break time of the emulsion. The break time decreases as the carbon chain of the hydrocarbon oxide used increases. Decreased break times could be obtained from the following order of hydrocarbon oxide: ethylene oxide, propylene oxide, butylene oxide, epicholohydrin.

Varying the length of the lipophilic end of the emulsifier molecule affects the mix time of the emulsion. When the length of the lipophilic portion, or the number of carbon atoms, of the emulsifier molecule is increased, the mix time of the emulsion increases. Synthetic fatty acids or dimerized tall oil rosins and tall oil fatty acids have a chain length of $C_{20}$ and greater and would produce an emulsion that would have a longer mix time than an emulsifier with a lipophilic portion with a chain length of $C_{18}$ created from oleic fatty acid, for example.

EXAMPLE 7

An emulsion made from the emulsifier of this invention with a lipophilic portion of $C_{18}$ would mix in about two (2) minutes while an emulsion made from the emulsifier of this invention with a lipophilic portion synthesized using a mixture of dimerized tall oil rosin, tall oil fatty acid would have a mix time of about 3.5 minutes.

One type of variable one faces in the industry is the gradation of the aggregate used in the emulsion. This means the size of the particles used to make up the aggregate, or the total number of large particles verses the total number of smaller particles. Table VI depicts a common aggregate gradation, as an example.

TABLE VI

| sieve size (U.S. standard) | % of aggregate passing |
| --- | --- |
| ½ inches | 100 |
| ⅜ inches | 90-100 |
| #4 | 60-90 |
| #10 | 40-70 |
| #50 | 25-50 |
| #100 | 10-35 |
| #200 | 0-15 |

As the total number of finer particles in the ratio of finer particles to larger particles increases, the total surface area of the aggregate increases approximately by a power of two (2). To compensate for the greater total surface area, more stability is needed in the emulsion to coat the aggregate before it breaks. One of the methods outlined above of accomplishing this is through the addition of water into the emulsion/aggregate mixture. Increasing the amount of water ($H_2O$) in the resulting mix will decrease the viscosity of the mixture, increases the mix time eventually to a point causing excessive run off of the asphalt emulsion. In theory, increasing the amount of water in the mix increases the layer of water molecules surrounding the aggregate thus not allowing the emulsion to make contact with the stone for a long enough period of time to coat and the emulsion to break.

Excessive Water decreases the viscosity of the mix and increases the stability of the emulsion aggregate mixture by coating the larger surface area of the finer aggregates (portion passing #200 sieve) and allowing for 100% coating and continued mixing for five (5) minutes. A second method of accommodating for this problem is to increase the lipophilic end of the molecule. A third method is to change the pH of the emulsion. A fourth method is to increase the amount of hydrocarbon oxide in the emulsifier molecule.

Another variable one commonly faces in the industry is the type of aggregate used. Examples of commonly used aggregate are creek gravel and limestone. The adsorption properties of the aggregate used will affect the mix time of the emulsion/aggregate mix. To achieve the desired mix time that accommodates for the different types of aggregate used, the pH of the emulsion as outlined above is adjusted accordingly. The addition of either acid or base is made to achieve the desired effect in the mixing operation. Extending the carbon structure length of the hydrocarbon oxide portion would lengthen mix time, as well as extending the lipophilic portion of the molecule. Adding additional moisture to the mix would lengthen the mix time as a further alternative.

A different challenge faced in the field is the amount of moisture present in the aggregate used. The greater the volume of water that coats the aggregate, the greater amount that must evaporate before the emulsifier can attach itself to the aggregate. Depending on the amount of total moisture present in the emulsion/aggregate mixture, the mix time may be extremely long (as much as a day) and coating of the aggregate will not occur until enough of the water present has evaporated. Options available to vary the mix time when the emulsifier of the present invention is employed include, adjusting the pH, total use level of the emulsifier, switching to molecules of different chain lengths of the hydrocarbon oxide portion and/or lipophilic portion, or varying the amounts of the hydrocarbon oxide used.

It is common in the industry to use hydrocarbon solvents, such as #2 diesel, kerosene, and naphtha in order to lower the viscosity of the residue of the asphalt from distillation. The presence of these hydrocarbon solvents assists mixability of the emulsion and also assists in coating of dry or wet aggregate with emulsifier. When using the emulsifier molecule of this invention, the presence of these hydrocarbon solvents does not affect the mix time of either wet or dry aggregate.

EXAMPLE 8

When an emulsion created by using an emulsifier of the preferred embodiment of this invention is used of a wt. % of 1.0 to 2.0 with #2 diesel fuel present of a wt. %, the emulsion/aggregate mixture will mix and achieve 100% coating and continue to be fully coated for five (5) minutes continuous laboratory mixing.

The type of asphalt used to make the emulsion could be polymer modified or conventional. Examples of polymers used to modify asphalt include, but are not limited to, SBS block co-polymers, ethylene vinyl acetate, neoprenes, natural and styrene butadiene rubber as a latex or solid, and any other known to be used in the asphalt industry. Examples of oils used in polymer modified asphalts include naphthnic, paraffinic, aromatic, and hydrocarbon solvents. The emulsifier of this invention works well with conventional and polymer modified asphalts of penetration (expressed in 1/10 mm units at 100 grams for five (5) seconds and 77° F.) of zero (0) to plus five hundred (+500) with the normal or optimum penetration range being thirty (30) to two-hundred (200) penetration. Options available to vary the mix time when the emulsifier of the present invention is employed to accommodate for the type of asphalt used include, adjusting the pH, total use level of the emulsifier, switching to molecules of different chain lengths of the hydrocarbon oxide portion and/or lipophilic portion, or varying the amounts of the hydrocarbon oxide used.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of making and using an emulsifier in asphaltic emulsion/aggregate mixes, comprising the sequential steps of:

initiating synthesis of an emulsifier molecule by reacting about one mole of tall oil, fatty acid or alcohol selected from the group tall oil rosin, tall oil fatty acid, synthetic fatty acid, fatty alcohol, synthetic alcohol, and combinations thereof, and about 25 to 100 moles of hydrocarbon oxide selected from the group consisting of ethylene oxide, propylene oxide, butylene oxide, and epichlorohydrin;

completing synthesis of said emulsifier molecule by mixing at least one mole of a phosphate moiety;

mixing a selected quantity of the synthesized emulsifier molecule with selected quantities of water, asphalt, and mineral acid or mineral base to form an asphaltic emulsion; and mixing a selected quantity of the mixed emulsion with selected quantities of aggregate and water to form an emulsion/aggregate mix.

2. A method, as described in claim 1, further comprising:

adjusting the pH of an asphaltic emulsion created by using the newly synthesized emulsifier by varying the quantity of acid or base either before or after the introduction of asphalt during the formation of the asphaltic emulsion.

3. A method, as described in claim 1, further comprising: varying the amount of emulsifier used in the emulsion formation so as to vary the mix time of the emulsion aggregate mixture.

4. A method, as described in claim 1, further comprising: varying the amount of hydrocarbon oxide used in synthesizing the emulsifier molecule.

5. A method, as described in claim 1, further comprising: using one of the group of said hydrocarbon oxides having a longer chain length longer than that of ethylene oxide to increase the mix time of the emulsion/aggregate mix over the mix time if ethylene oxide is used.

6. A method, as described in claim 1, wherein said tall oil, fatty acid or alcohol forms a lipophilic portion of said emulsifier molecule and including the additional step of increasing the chain length of said lipophilic portion in order to increase the mix time of said emulsion/aggregate mix.

7. A method, as described in claim 1, further comprising: varying the amount of water used to create the emulsion/aggregate mix in order to adjust its mix time.

* * * * *